US 7,900,159 B2

United States Patent
Tsao et al.

(10) Patent No.: US 7,900,159 B2
(45) Date of Patent: Mar. 1, 2011

(54) TECHNIQUES FOR REPRESENTING AND ORGANIZING USER INTERFACE DATA

(75) Inventors: Anson Tsao, Redmond, WA (US); Christopher Burrows, Seattle, WA (US); Ryan Molden, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 925 days.

(21) Appl. No.: 11/820,120

(22) Filed: Jun. 18, 2007

(65) Prior Publication Data
US 2008/0313561 A1 Dec. 18, 2008

(51) Int. Cl.
*G06F 3/048* (2006.01)

(52) U.S. Cl. .................. 715/810; 715/813; 715/817; 715/841

(58) Field of Classification Search ............ 715/810, 715/813, 817, 841
See application file for complete search history.

(56) References Cited

U.S. PATENT DOCUMENTS

| 5,119,475 | A | 6/1992 | Smith et al. |
| 5,760,768 | A | 6/1998 | Gram et al. |
| 6,583,798 | B1 | 6/2003 | Hoek et al. |
| 7,523,413 | B2 * | 4/2009 | Sims .................. 715/788 |
| 2002/0015224 | A1 | 2/2002 | Ganser et al. |
| 2002/0054142 | A1 | 5/2002 | Williams et al. |
| 2002/0083415 | A1 * | 6/2002 | Jazdzewski .......... 717/111 |
| 2004/0061724 | A1 | 4/2004 | Sato |
| 2004/0187140 | A1 * | 9/2004 | Aigner et al. ......... 719/328 |
| 2005/0091641 | A1 * | 4/2005 | Starbuck et al. ...... 717/122 |
| 2005/0104859 | A1 | 5/2005 | Need et al. |
| 2006/0048060 | A1 | 3/2006 | Mohr et al. |

FOREIGN PATENT DOCUMENTS

| EP | 0398646 A2 | 11/1990 |
| WO | 2006065066 A1 | 6/2006 |

OTHER PUBLICATIONS

Ambrosius Lee, "Customizing the User Interface through the CUI Editor", pp. 1-19. 2005.
R. Karger David, "Prerequisites for a Personalizable User Interface", pp. 1-4. 2004.

* cited by examiner

*Primary Examiner*—Tadeese Hailu

(57) ABSTRACT

Techniques are described for representing commands of a user interface of an application. One or more command descriptions for one or more commands are received. Each of the command descriptions has one or more properties and represents an instance of one of the commands. One or more command group descriptions for one or more command groups are received. Each of the command group descriptions has one or more properties, represents an instance of one of the command groups at a level in a group hierarchy, and specifies one or more group members. Each of the group members represents a derived instance of one of the commands or a derived instance of one of the command groups. Properties of each derived instance of a command and each derived instance of a command group inherit properties from one or more ancestor instances.

20 Claims, 13 Drawing Sheets

TECHNIQUES FOR REPRESENTING AND ORGANIZING USER INTERFACE DATA

BACKGROUND

Applications have a user interface that can take a variety of different forms. One common user interface includes menus and toolbars. On a computer system, each application program can have its own user interface which appears when the application program is executing. An application may also be a composite application consisting of multiple, different application programs. Each of the different application programs may be a component of the composite application. The composite application may present to a user a single common interface for all the component application programs. With this single interface, all the application programs of the composite application may share the same command menus and toolbars. A single user interface for the composite application may be shared between all the application programs. One drawback of the foregoing is that each application program contributing to the single user interface may be developed independently of the other application programs of the composite application. In such instances, the user interface for each program of the composite application may require a collaborative effort while the remaining portions of each application program are independently developed.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques are described for representing commands and other data in a user interface of an application. The commands and command groups are described. Each of the command groups define a logical hierarchy of one or more commands and command groups. Object instances are defined for the commands and command groups. Each member of a command group is either a command or another command group having a derived instance, respectively, of a command or command group. Derived instances inherit property values from ancestors that may be overridden by specifying property values for the derived instances.

DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

Figure 1:
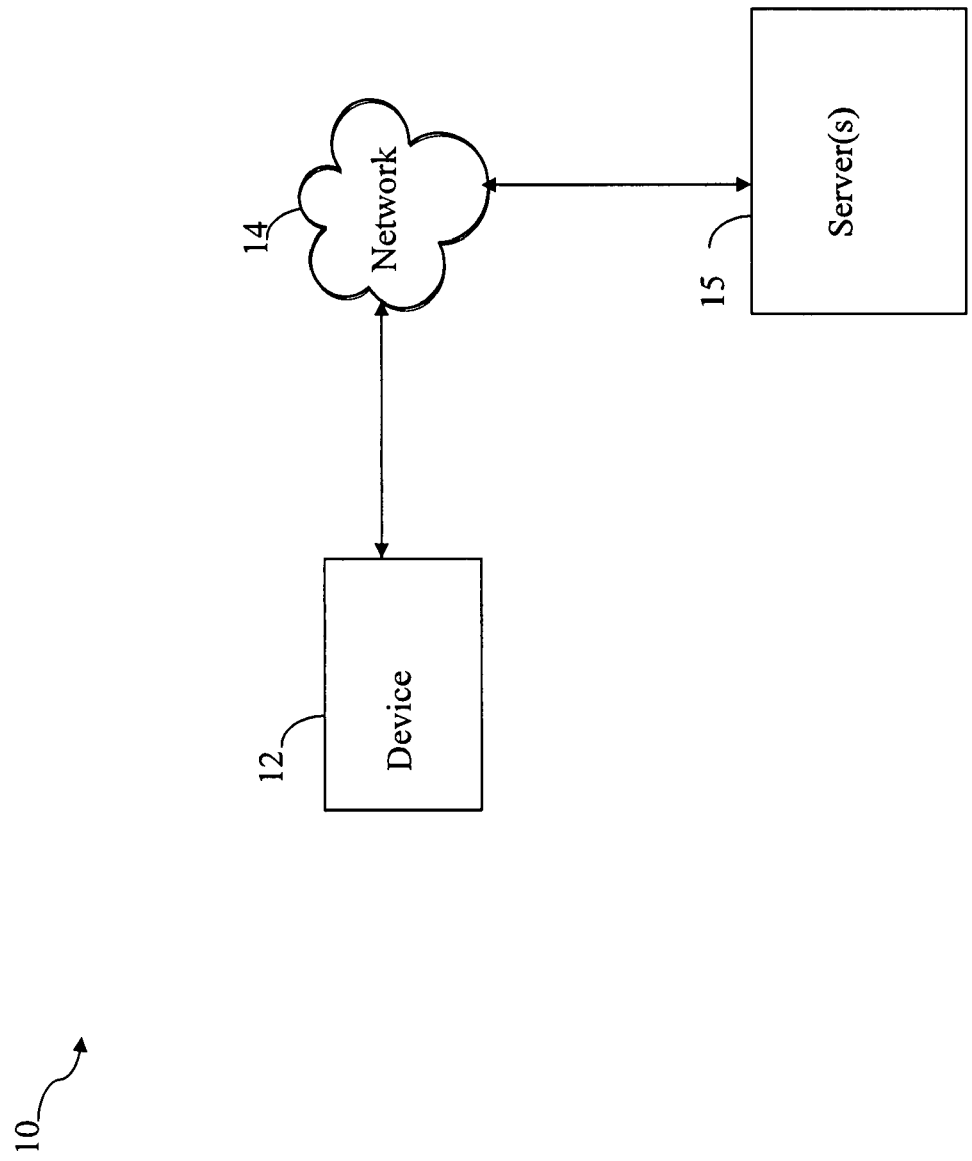
FIG. 1 is an example of an embodiment illustrating an environment that may be utilized in connection with the techniques described herein.

Referring to FIG. 1, illustrated is an example of a suitable computing environment in which embodiments utilizing the techniques described herein may be implemented. The computing environment illustrated in FIG. 1 is only one example of a suitable computing environment and is not intended to suggest any limitation as to the scope of use or functionality of the techniques described herein in connection with user interfaces.

The techniques set forth herein may be described in the general context of computer-executable instructions, such as program modules, executed by one or more computers or other devices. Generally, program modules include routines, programs, objects, components, data structures, and the like, that perform particular tasks or implement particular abstract data types. Typically the functionality of the program modules may be combined or distributed as desired in various embodiments. Those skilled in the art will appreciate that the techniques described herein may be suitable for use with other general purpose and specialized purpose computing environments and configurations. Examples of well known computing systems, environments, and/or configurations include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

Included in FIG. 1 are a device 12, a network 14, and a server 15. The device 12 may be, for example, a computer, such as a personal computer, having a display output device and an input device providing for interactive I/O with a user thereof. In following paragraphs, additional details are provided with respect to the device 12.

The device 12 included in FIG. 1 is exemplary for purposes of illustrating the techniques described herein in connection with software components. In one embodiment, any device 12 providing the functionality described herein may be included in an embodiment. The device 12 may include a processor used to execute code included in one or more program modules. Described in more detail elsewhere herein are program modules that may be executed by the device 12 in connection with the techniques described herein. The device 12 may operate in a networked environment and communicate with the server 15 and other computers or components not shown in FIG. 1. As described herein, the device 12 may be a personal computer. In other embodiments, the functionality of device 12, or the device 12 itself, may be included in another component in accordance with a particular environment in which the device 12 is utilized.

As will be described in following paragraphs in more detail, software may be installed on the device 12. Such software may include code which is executed to facilitate representation and processing in connection with data for a user interface of an application program. The application program may be, for example, a composite application having a single user interface to which multiple application components contribute. The techniques herein as will be described in following paragraphs allow each component of the composite application program to provide descriptions representing commands and command groups in a logical hierarchical organization. In connection with a single user interface for the composite application, the descriptions of the different application components may be merged providing an initial, unified set of commands having an initial logical organization. The descriptions of the commands and/or command organization may be updated during program execution for use with the single user interface. The description of the commands and the organization of the commands may be expressed using an extensible object representation described herein having both static and dynamic attributes reflecting the static and dynamic properties of commands and the command organization.

It will be appreciated by those skilled in the art that although the device 12 is shown in the example as communicating in a networked environment, the device 12 may communicate with other components utilizing different communication mediums. For example, the device 12 may communicate with one or more components utilizing a network connection, and/or other type of link known in the art including, but not limited to, the Internet, an intranet, or other wireless and/or hardwired connection(s) to the server 15 and/ or other components.

It should be noted that although the device 12 is illustrated as having network connectivity to the server 15, the techniques described herein may be used in connection with a device directly connected to the server 15 without a network. Furthermore, it should also be noted that the device 12 may also operate in a standalone mode with no connectivity to a server.

Figure 2:
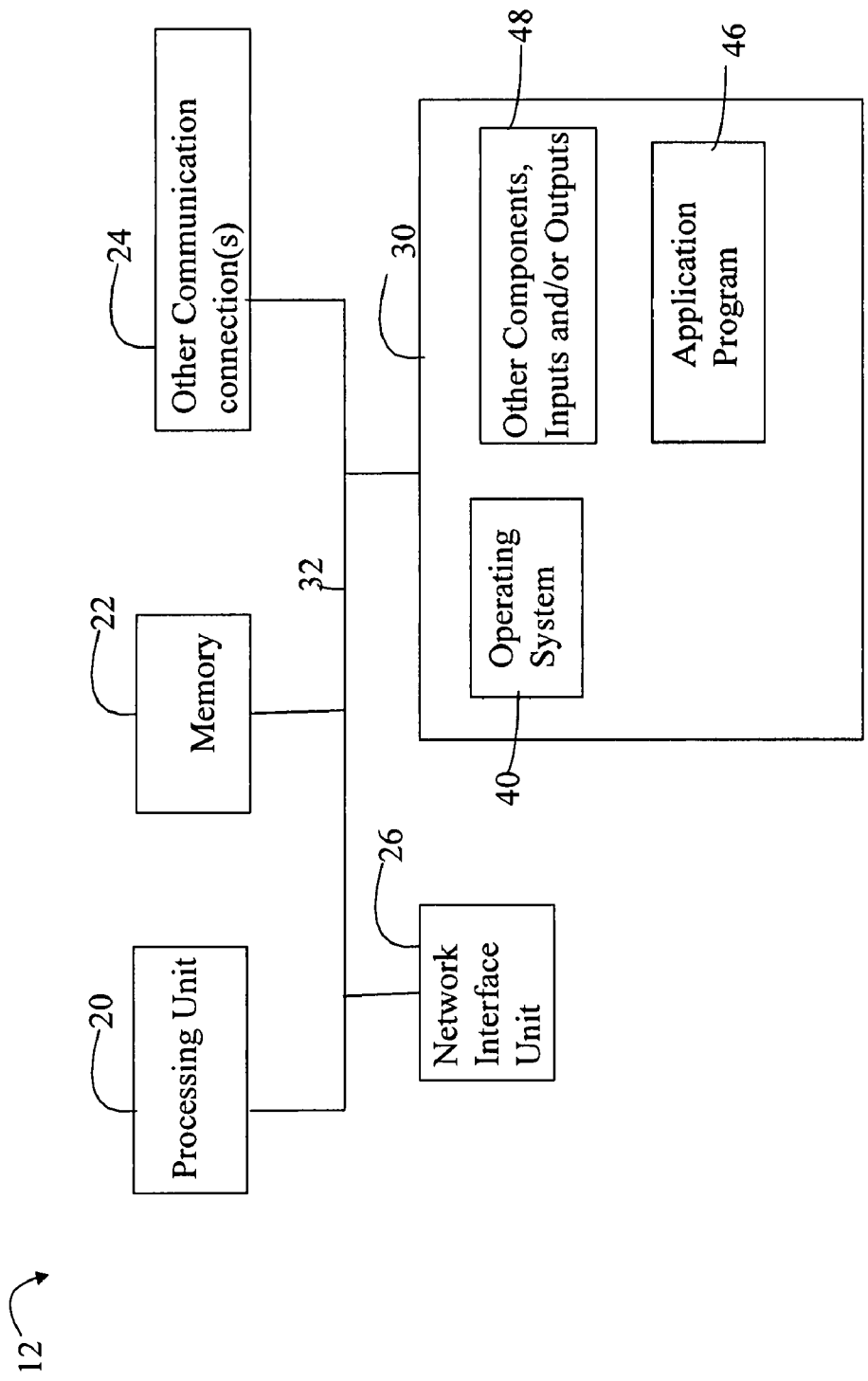
FIG. 2 is an example of an embodiment of components that may comprise a device of FIG. 1.

Referring to FIG. 2, shown is an example of components that may be included in the device 12 as may be used in connection with performing the various embodiments of the techniques described herein. The device 12 may include one or more processing units 20, memory 22, a network interface unit 26, storage 30, one or more other communication connections 24, and a system bus 32 used to facilitate communications between the components of the device 12.

Depending on the configuration and type of user device 12, memory 22 may be volatile (such as RAM), non-volatile (such as ROM, flash memory, etc.) or some combination of the two. Additionally, the device 12 may also have additional features/functionality. For example, the device 12 may also include additional storage (removable and/or non-removable) including, but not limited to, USB devices, magnetic or optical disks, or tape. Such additional storage is illustrated in FIG. 2 by storage 30. The storage 30 of FIG. 2 may include one or more removable and non-removable storage devices having associated computer-readable media that may be utilized by the device 12. The storage 30 in one embodiment may be a mass-storage device with associated computer-readable media providing non-volatile storage for the device 12. Although the description of computer-readable media as illustrated in this example may refer to a mass storage device, such as a hard disk or CD-ROM drive, it will be appreciated by those skilled in the art that the computer-readable media may be any available media that can be accessed by the device 12.

By way of example, and not limitation, computer readable media may comprise computer storage media and communication media. Memory 22, as well as storage 30, are examples of computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by device 12.

The device 12 may also contain communications connection(s) 24 that allow the computer to communicate with other devices and components such as, by way of example, input devices and output devices. These and other devices are well known in the art and need not be discussed at length here.

In one embodiment, the device 12 may operate in a networked environment as illustrated in FIG. 1 using logical connections to remote computers through a network. The device 12 may connect to the network 14 of FIG. 1 through a network interface unit 26 connected to bus 32. The network interface unit 26 may also be utilized in connection with other types of networks and/or remote systems and components. The device 12 may also utilize the techniques herein standalone with external connectivity.

One or more program modules and/or data files may be included in storage 30. During operation of the device 12, one or more of these elements included in the storage 30 may also reside in a portion of memory 22, such as, for example, RAM for controlling the operation of the user computer 12. The example of FIG. 2 illustrates various components including an operating system 40, one or more application programs 46, and other components, inputs, and/or outputs 48.

The operating system 40 may be any one of a variety of commercially available or proprietary operating systems. The operating system 40, for example, may be loaded into memory in connection with controlling operation of the device 12.

The application program 46 may be a composite application program as described above having multiple application components each contributing data for use with a single user interface. As an example, each of the application components may have a set of commands which are combined and presented to a user in the single user interface. The techniques herein describe how each application component may represent commands and their associated logical organization using an extensible and dynamic data object representation. The data contributions of each application component to the single user interface may be merged in accordance with the representation and reflect an initial state of the composite application. The objects representing commands and command groupings of the user interface may be updated in accordance with any state changes of the composite application. The user interface may be accordingly updated to reflect the state changes.

Figure 3:
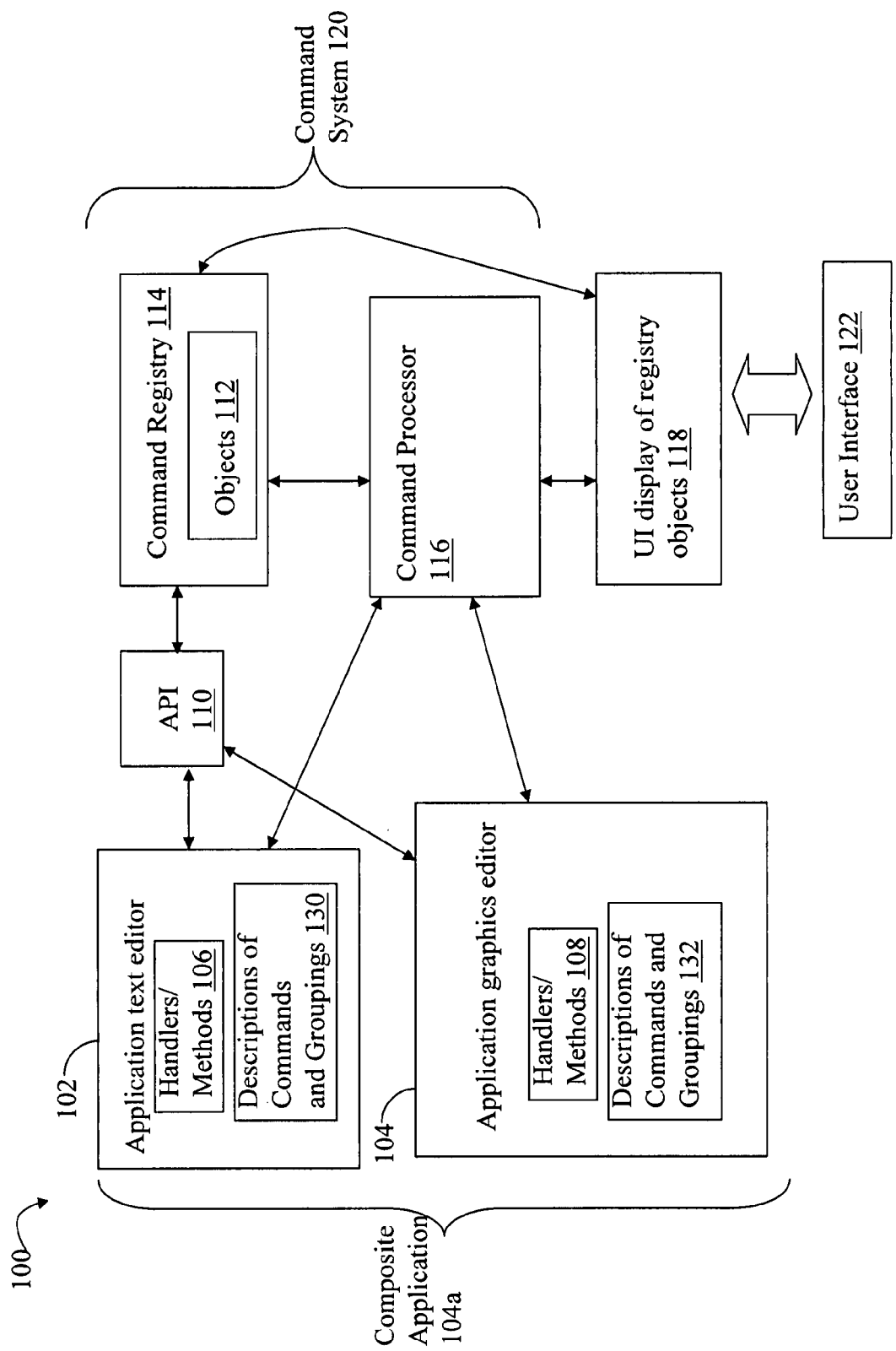
FIG. 3 is an example of components that may be included in a computer or other device for use in connection with the techniques herein.

Referring to FIG. 3, shown is an example of components that may be included on a device such as a computer. The example 100 represents components that may be used in connection with a composite application program, such as a word processing application. The example 100 includes an application text editor 102 and an application graphics editor 104. The components 102 and 104 may be included in the composite application program 104a. Each application component 102 and 104 may have residing therein its respective descriptions of commands and an associated logical command organization. For example, the application text editor 102 may include descriptions of commands and groupings 130 representing the commands and associated logical organization for the text editor 102. Similarly, the application graphics editor may include descriptions of commands and groupings 132 representing the commands and associated logical organization for the graphics editor 104. Techniques for representing the commands and command groupings forming a logical organization used with a user interface are described in more detail in following paragraphs.

The command registry 114 may be invoked as part of the startup processing when the composite application 104a is invoked. The command registry 114 may use an API 110 to query the application components 102 and 104 as part of the composite application 104a startup to obtain the descriptions of commands and command groupings as represented by elements 130 and 132. The data of 130 and 132 represents the data contributions of each component for use in populating command menus, toolbars and other entities of a single user interface for the composite application. It should be noted that the command registry 114 may also be invoked at other points in connection with the composite application 104a such as when first needed or used by the composite application 104a.

The command registry 114 may determine which application components are included in the composite application 104a using any one of a variety of different techniques. For example, each of the components 102 and 104 may be included in an expected location on a system drive of the computer system. In one embodiment, the components 102 and 104 may be executable code modules such as DLLs (dynamic link libraries). The command registry 114 may inspect the location, such as a directory on the system drive, and determine the different executable code modules therein as the different application components. The command registry 114 then obtains the descriptions of the commands and command groupings from each application components using the API 110.

In one embodiment as illustrated in FIG. 3, the descriptions of the commands and command groupings may be included as part of the executable code modules 102 and 104. For example, the composite application and application components 102 and 104 may be generated using the .NET™ Framework by Microsoft Corporation. When code of each application component is compiled for runtime, the code is converted into an intermediate language and included in a portable executable along with any metadata generated by the compiler. In the .NET™ Framework, the metadata may include custom attributes and/or resources expressing the descriptions for the commands and command groupings 130 and 132. The custom attributes provide for storage of the descriptions 130 and 132 in the metadata portion of the portable executable, retrievable by the reflection services of the .NET Framework by the API 110. The resources provide for an alternate location to store the descriptions 130 and 132, retrievable by the resources services of the .NET Framework by the API 110 or directly by the command registry 114.

In another embodiment, the descriptions of the commands and groupings may be stored in a separate file for each application component. The one or more files including the descriptions for the components 102 and 104 may be provided to the command registry 114, for example, by storing the files in a known, expected location along with the application components. The command registry 114 may access the files directly or may communicate with the API 110 to obtain the contents of the files. As will be described in more detail elsewhere herein, the data of 130 and 132 may be in XML (extended markup language) in accordance with the XML format known in the art.

Once the command registry 114 obtains the information of 130 and 132, the command registry merges the information of 130 and 132 and then creates, initializes and stores one or more objects 112 in accordance with a data representation or model described in more detail in following paragraphs. The command registry 114 builds and maintains the objects 112 in memory having an initial value in accordance with a state at application startup. An initial value of the objects 112 may be communicated to the UI display of registry objects 118. The component 118 uses the data of the objects 112 to initially populate the user interface elements as rendered in a displayed user interface 122 for the composite application 104a. For example, an application may use toolbars and menus and the object data 112 may be used to populate the various toolbars and menus in accordance with a logical grouping structure also represented in the objects 112. The component 118 may be used to render the toolbars, menus, ribbons, and the like as the user interface 122. A ribbon may be characterized as a displayed strip across the top of a window that exposes all the functions the program can perform in a single place. The ribbon presents to a user a consolidated display of all the functionalities a program can perform in a single place. Since the object data 112 represents commands independent of any particular UI display component 118, and can store extensible property values as described in subsequent paragraphs, as additional user interface elements are supported by 118, the same object data may be used with these additional elements. Thus, a same set of object data may be used to populate different user interface elements that may be supported in an embodiment. During execution of the application 104a, the object instances obtained by the UI display component 118 may be updated. Additionally, component 118 may request creation of new objects for new commands and associated logical command groupings. This is described in more detail in following paragraphs.

The application components 102 and 104 include, respectively, handlers/methods 106 and 108. The handlers/methods are invoked by the command processor 116 in connection with, for example, determining user actions affecting the application state and modifying an object as needed, for example, in response to a user action as described below.

During execution of the application components 102 and 104, the state of the composite application 104a may change. In response, the command processor may facilitate updating objects describing the commands and/or associated command organization. For example, a user may select a command, such as a CUT command, to be executed from a displayed menu of the user interface 122. The component 118 detects the command selection and forwards its copy of the corresponding command object along with current context information to the command processor 116. The current context information may describe various aspects of the application 104a in accordance with the state of the application. For example, the context information may indicate the currently selected component which is in use (e.g., 102 or 104) in connection with a current data operation, a currently opened file and associated type (e.g., text, graphics), and the like. The command processor queries the command registry 114 for what command handlers may be invoked in connection with the requested command. For example, there may be two different implementations of the CUT command each associated with a different one of the components 102 and 104. There may be a first CUT command handler/method included in 106 of the component 102 invoked when editing text, and a second CUT command handler/method included in 108 of the component 104 invoked when editing graphics. Both methods may be returned to the command processor 116 by the command registry 114 in response to the query. For each command handler/method, the command processor 116 may also obtain a set of criteria defining when the associated method should be invoked. The criteria may describe one or more contexts as to when to invoke the associated method. For example, the criteria associated with the CUT command method for the component 102 may include an open file which is a text file having text selected therefrom. The criteria associated with the CUT command method for the component 104 may include an open file which is a graphics file. Based on the foregoing, the command processor 116 receives a set of current context information including a type of the file currently open and being edited. The command processor 116 then selects one of the command handlers returned by the command registry 114 based on whether the criteria of a given command handler matches the current context information describing the current state of the application. The command processor then invokes the selected command handler to execute the command based on the current context information. It should be noted that there may be multiple handlers relevant to a same set of current context information. In such cases, the handler deemed to be the most relevant may be selected.

A similar data flow between components of FIG. 3 may be used to describe processing performed in connection with updates to a displayed menu using update handlers or methods for updating objects for the commands and/or associated command organization. For example, if a user performs a text selection when using the application text editor 102, the command processor 116 may be notified by the component 118. The component 118 may communicate a current command object to the command processor 116 for updating along with current context information. The command processor 116 may query the command registry 114 for the one or more update handlers that may be used to appropriately update the command properties of the command object. The command processor 116 may also obtain criteria for each of the update handlers describing when to invoke the particular update handler. The command processor 116 selects one of the update handlers by determining whether the current context information matches the criteria of a particular update handler. The command processor then invokes the update handler to update the command object properties. The command object notifies the component 118 of any command object changes so that the user interface 122 may be accordingly updated.

As an example with updating, the user interface for the component 102 may include an EDIT menu with commands to CUT, COPY, and PASTE text. When no text is selected, CUT and COPY menu items may be inactive or disabled (e.g., grayed out in appearance on a displayed menu of the user interface). In response to a user selecting text, the CUT and COPY menu items as applied to component 102 are updated to no longer be greyed out or otherwise indicated as currently inactive. The component 118 passes to the command processor 116 the current CUT command object and current context information. As described above, based on the current context information, the component 102 may be indicated as the currently in-use component (e.g., text file open with text selected). The command processor queries the command registry 114 for the one or more methods for updating the CUT command object, and selects and invokes the appropriate method of the application component 102. The update handler of the application component 102 updates appropriate field(s) of the CUT command object to reflect the fact that the CUT command is now active and returns the updated CUT command object to the command processor 116. The updated CUT command object is communicated to the UI display 118 which accordingly updates the user interface 122 indicating the CUT command as active or "enabled". If the user then performs a CUT operation, the appropriate CUT command handler is invoked by the command processor to perform the CUT operation.

The elements 114, 116 and 118 may be executable code modules, such as DLLs. The components 114 and 116 may be included in a command system 120. The command system 120 and the component 118 may be code modules used by composite application 104a as well as other applications in connection with providing a user interface 122. The components 114, 116 and 118 may be included as part of the operating system on the computer or other device.

Figure 3A:
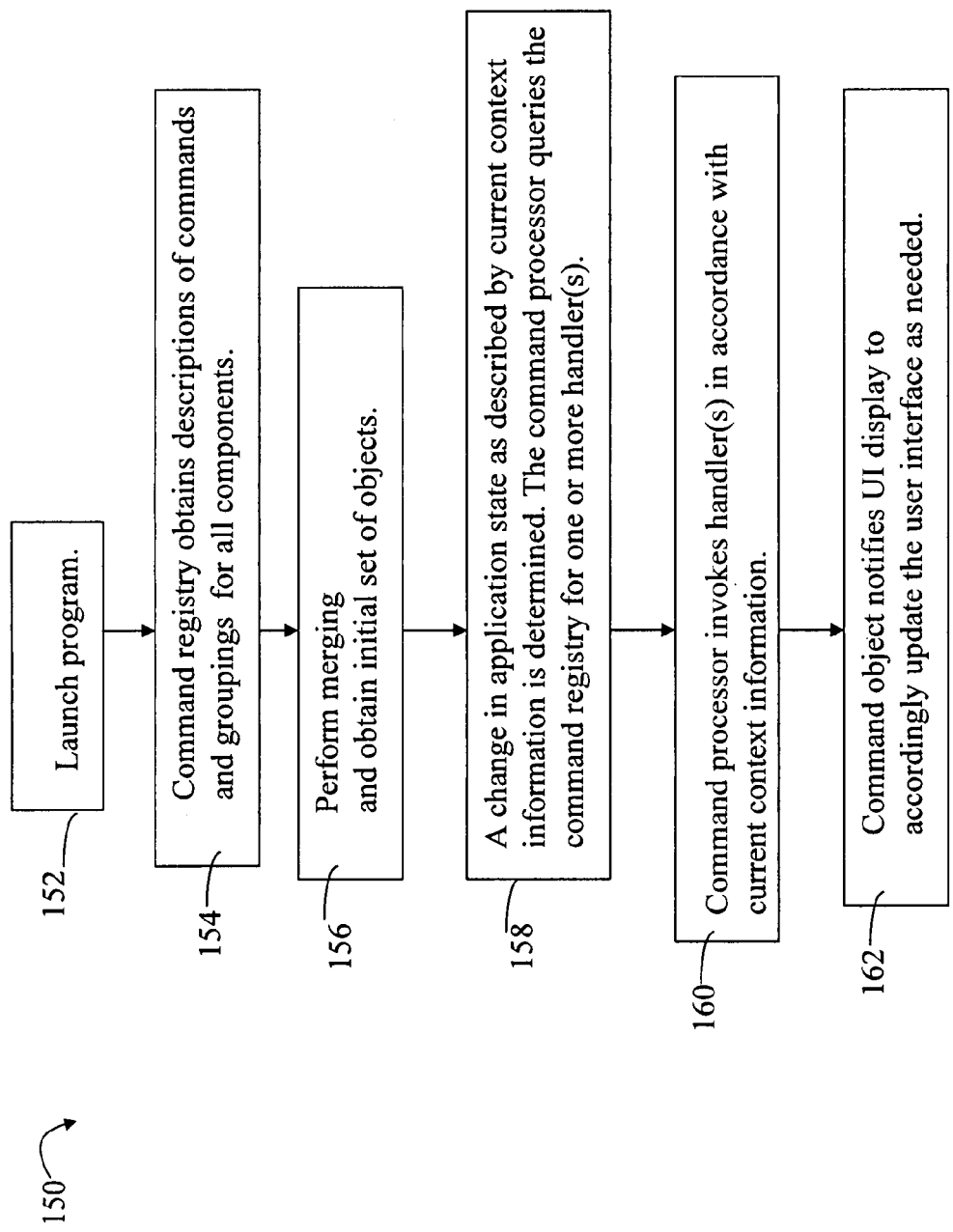
FIG. 3A is a flowchart of processing steps performed by the components of FIG. 3.

Referring to FIG. 3A, shown is a flowchart of steps outlining the general processing just described in connection with the components of FIG. 3. At step 152, the application program, such as the composite application program 104a is launched for execution. As part of the startup processing for the application program invoked in step 152, the command registry obtains the descriptions for the commands and associated command organizations for all components of the application program in step 154. At step 156, the descriptions are merged by the command registry and a set of objects is created and initialized for use in connection with the commands and command groups of the user interface for the application program. The merging is described in more detail in following paragraphs. The data in the objects is used in connection with populating the user interface elements displayed. With reference back to FIG. 3, the foregoing may be accomplished by the command registry 114 communicating the initialized objects to the UI display of registry objects 118. The application program executes and information regarding user actions and other application state changes are determined by the UI display component 118. The application state changes may be described by current context information. As described above, the component 118 may determine a user action, such as selection of a command for execution or other operation, requiring further processing. If a command is selected for execution, the appropriate command handler is determined and invoked. A user selection or action may also necessitate a response of updating the displayed user interface and associated object(s) (e.g., command and command organization objects) by invoking the appropriate update handler. The component 118 communicates the current context information along with the associated command object(s) and/or related command organization which need to be updated in response to application state changes to the command processor. The command processor queries the command registry for one or more handlers (e.g., command handlers or update handlers depending on the user action and context information).

At step 160, the command processor invokes the appropriate handler(s) to update the object(s) associated with the commands and/or related command organization information reflecting the user action or other application state change. At step 162, the updated object(s) associated with the commands and/or command organization information are obtained by the UI display component 118 to update the user interface accordingly. The UI display component 118 may watch for changes in the objects for the commands and command organization and retrieve any such changes.

Steps 158 and 160 provide for dynamically updating properties and creating new objects. It should be noted that the command processor may also periodically poll the application components. For example, for changes to properties, the command processor may poll the loaded and active handlers for visible commands or those commands currently displayed on the user interface. Additional polling may occur, for example, before a command user interface element, such as a pop-menu, and the like, become visible or is rendered for display.

What will now be described is how the descriptions of the commands and logical command organization may be represented for use by the command registry in connection with the techniques herein.

Figure 4:
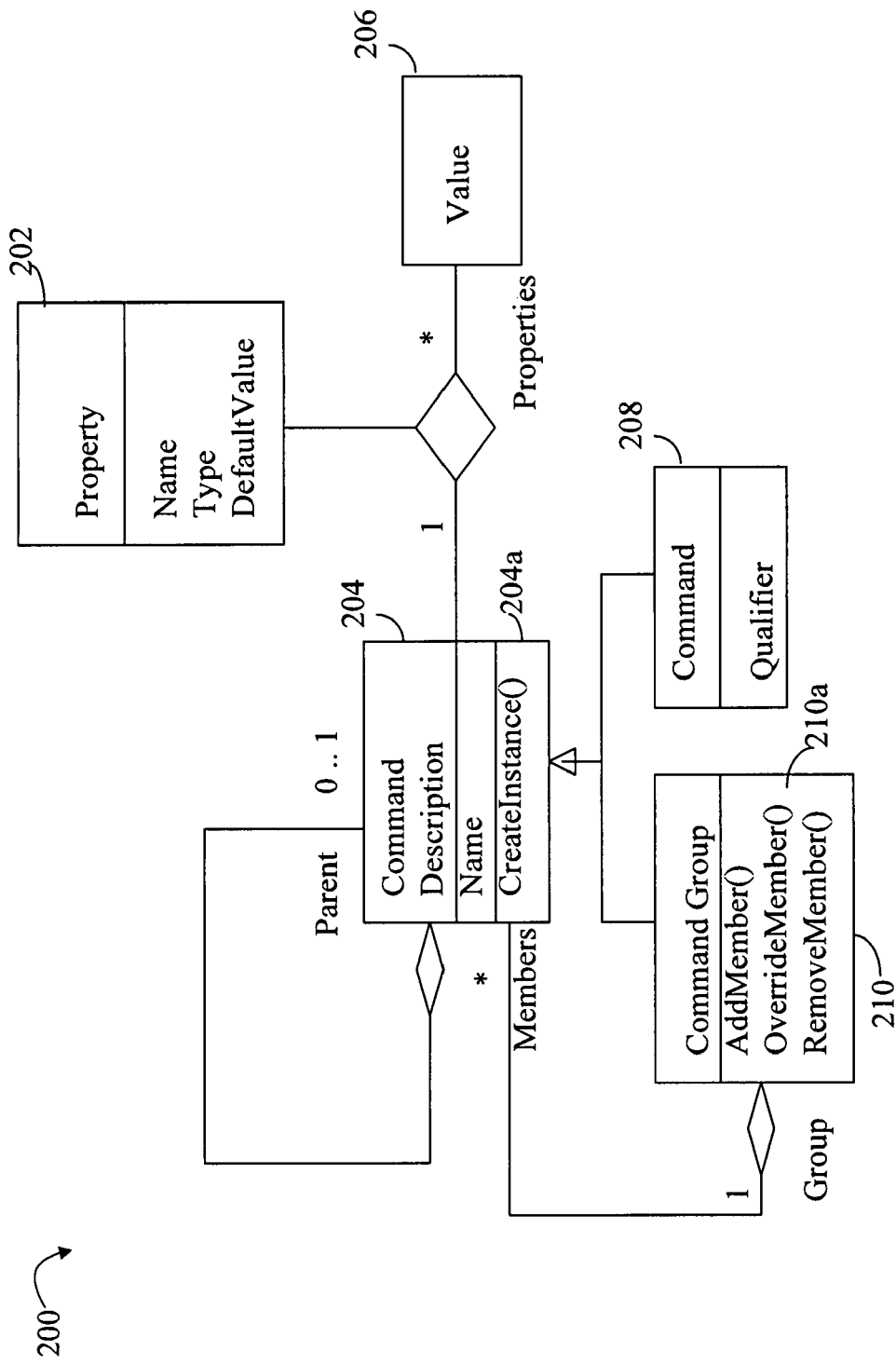
FIG. 4 is an example of a class diagram.

Referring to FIG. 4, shown is a class diagram for a command and command group that may be used to describe the commands and associated logical organization. The example 200 indicates that a command description entity 204 may be named and include zero or more commands 208 and zero or more command groups 210. Each instance of a command 208 or command group 210 may include one or more properties 202. For each property 202, a name, type and an optional default value 206 may be specified.

The method CreateInstance( ) of 204a may be a method to create an instance of a command or command group. The CreateInstance( ) is a method on a command or command group object which creates a derived instance, respectively, of the command or command group. The derived instance initially inherits all the properties (and group members in the case of a command group). The derived instances can deviate from the inherited parent when the properties and/or group membership are overridden when the update handlers are executed on those instances. The methods of 210a may be provided to add, remove, or override members of a command group. It should be noted that the concepts of inheritance and overriding in connection with properties of a command and command group are described in more detail in following paragraphs. The methods of 204a may be called, for example, by the command registry when placing a command in a command group. The methods of 204a may also be invoked, for example, by the component 118 of FIG. 3 when creating a new instance of a command during execution of an application. Methods of 210a may be invoked by the command registry when initially creating the logical command structure. Methods of 210a may also be called by update handlers to dynamically populate command groups for dynamically updating command object properties, for example, with current lists and selections of open files, recent document lists, and the like. An embodiment may also include other methods for use in connection with the techniques herein than as illustrated in the example 200 of FIG. 4.

Each command 208 may also include an optional command qualifier that may be used to refer to a particular instance of a command. The use of command qualifiers is described in more detail in following paragraphs. The properties for commands may be used to describe aspects of visual representation of the commands. For example, command properties may include the text string displayed as part of the command menu, an image used as the icon for the command on the user interface, and the like. The command properties may also indicate various dynamic state aspects of the command such as whether the command is enabled or disabled. With reference to the previous example with the CUT command, the CUT command may have an enabled/disabled state property with a binary state value. The enabled/disabled state property may be set to reflect enabled when text is selected. Otherwise, the CUT command may be disabled with the disabled state property reflecting this state. The enabled/disabled state property may represent a dynamic aspect of the associated object having an initial default value which can be modified in accordance with state changes of the application program. Other state properties may indicate, for example, whether a command is visible or included on a user interface at a current point in time. The command properties may also include other dynamic properties such as execution parameters. The execution parameters are dynamic as described in connection with the property. However, the execution parameter may indicate more than a binary (e.g., enable/disable) state. An execution parameter may have a value, such as a numeric value, which may be set in response to user actions. For example, an execution parameter may be a property for a ZOOM or VIEW command. The ZOOM command may provide for different levels of magnification for viewing text rendered on a display. A ZOOM level may be set to a quantity corresponding to a ZOOM or VIEWING value, such as 50%, 100%, 200%, and the like. The execution parameter may have an initial or default value which is then changed at various times by a user, for example, when viewing a document with the application text editor component 102 of FIG. 3. As another example, a command may display text which is updated dynamically in response to various changes in application state. As yet another example, a command may display a list of items which can be updated dynamically such as, for example, a list of recently edited files, currently active windows, and the like.

As described in connection with FIG. 3, at startup time, the command registry may initialize command properties with default values that may be optionally specified. At runtime of the application program, the properties may be dynamically updated by the command processor invoking the appropriate update handlers. The properties associated with a command object are also extensible in that a new property may be added or removed from a command object at runtime as well as allowing modification of property values. For example, an initial definition of a command object may not specify a property. A change in application program state during runtime of the application may result in the addition of a new property for the command object. The command registry may create an object instance for each command. New commands may also be added during runtime of the application.

Commands are logically organized into command groups. A command group may include one or more commands and command groups. The command group may be characterized as an organizing or grouping structure having members which are commands or command groups. The command groups represent a logical organization or representation of the commands in a level or nesting hierarchy forming a tree-like structure. For example, command groups may be used to represent the logical organization of commands for the user interface. Command groups may include the same properties as described above in connection with commands. Additionally, command groups may include other properties which may be applicable for only command groups. For example, command groups may include a menu mode property indicating a type of menu associated with the command grouping. Values that may be specified with the menu mode property in one embodiment are popup, menu group, or none. The popup may indicate that the command group is to appear as a popup menu in a separate menu box. The menu group may indicate that the command group is to appear as a grouping in a consolidated menu with other menu groups having a line or other visual separator between the groupings. None may indicate that the displayed user interface may provide no visual identification that a command group exists. For example, the command of a command group may be displayed but there may be no visual indicator or separator delineating the command group and associated commands. The command registry creates an object instance for each command group included in the initial set of information obtained during application startup.

As described above in connection with commands, the properties associated with a command group object are also extensible in that a new property may be added or removed from a command group object at runtime as well as allowing modification of property values of the command group. Additionally, membership in a command group is also extensible in that members (e.g., commands and command groups) of a group may be added and removed during runtime of the application. For example, a change in runtime state of the application may cause a command to be added or removed from a command group. Thus, the command may be accordingly added or removed from the command group in the user interface. Additionally, new command groupings may also be specified during runtime of the application program.

It should be noted that other embodiments may include other properties for commands and command groups in addition to, or in place of, those as described herein.

Referring back to FIG. 3, the command system 120 provides a general mechanism to organize commands logically in command groups. How the logical command group structure is interpreted for display in the user interface 122 is done by the component 118.

Figure 5:
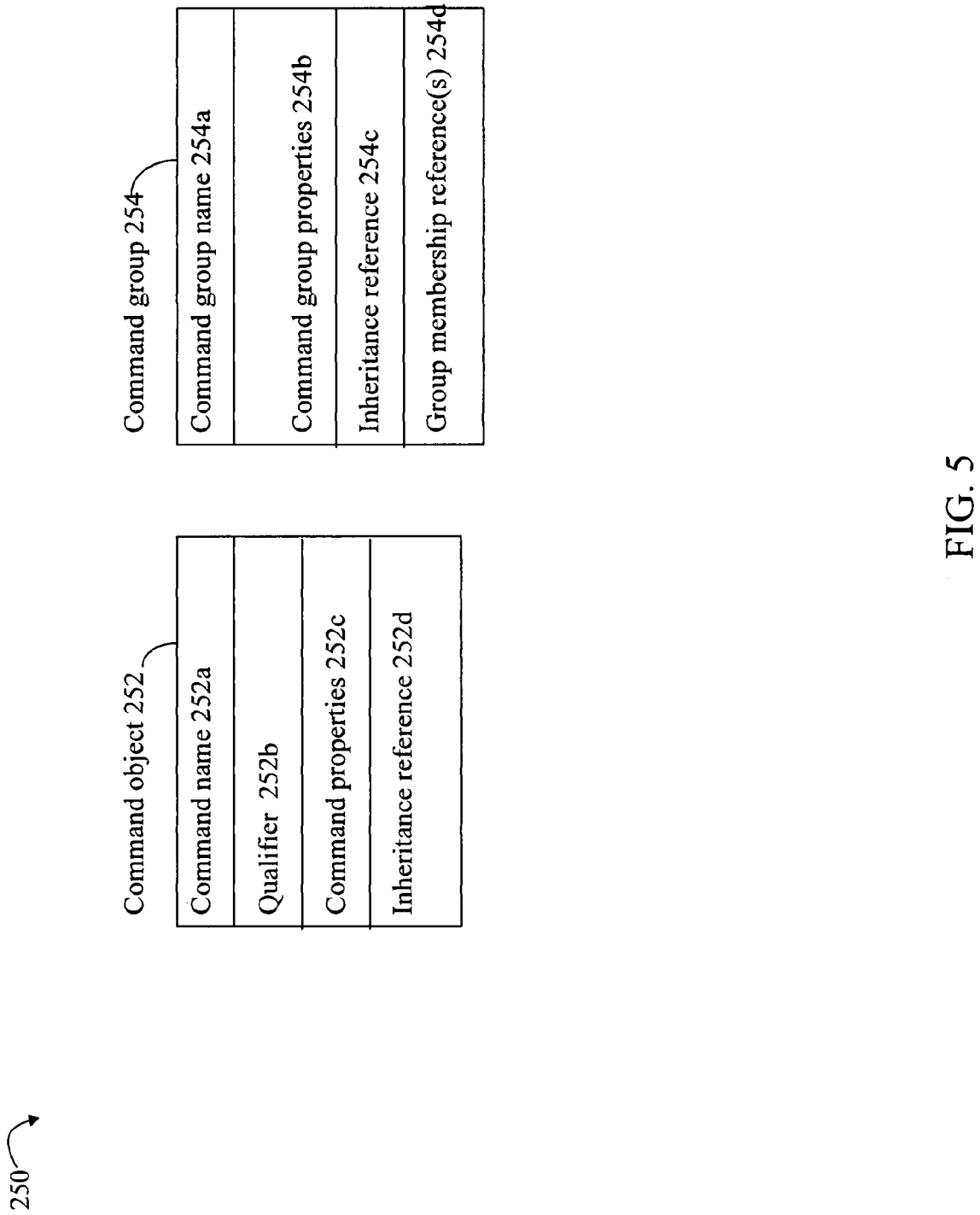
FIG. 5 is an example representation of command and command group objects.

Referring to FIG. 5, shown is an example representation of a command object and a command group object. The example 250 includes a command object 252 with a command name 252a, qualifier 252b, properties 252c, and an inheritance pointer or reference 252d. The command group object 254 includes a command group name 254a, properties 254b, an inheritance pointer or reference 254c, and one or more group membership pointers or references 254d. An instance of 252 may be created for each command and an instance of 254 may be created for each command group.

When a command or command group instance is added as a member of another command group, a derived instance of the command or group is included as a group member. The inheritance reference 252d for a first command object is used to identify the command instance from which the first command object is derived. If the first command object is derived from a second command object, the second command object may be referred to as the parent of the first command object. The inheritance reference 254d for a first command group object is used to identify the command group instance from which the first command group object is derived. If the first command group object is derived from a second command group object, the second command group object may be referred to as the parent of the first command group object. The group membership reference(s) 254 may identify each member of the group by including a pointer or reference to each object instance included in the group.

The use of derived instances of command and command group objects allows a child or derived object to specify properties which override those properties of its parent. A child object inherits properties of its parent object with any modifications or customizations to those properties specified as new property values of the child object. In other words, the properties and associated values of the parent object are used unless the child object overrides a property value by specifying a different value for a same property of the parent object. The foregoing inheritance and overriding may be applied to multiple levels of inheritance in a recursive fashion so that generally an object inherits properties and values from its ancestors. Each object overrides a property of its parent if the object specifies a value for a property which is also specified in the parent. The use of overriding and inheritance (e.g., value propagation) provides for user interface customization from a previous definition of a command or command group.

A derived command group by default has the same set and ordering of group members as the parent group. However, the derived group can add, remove, rearrange and otherwise override members inherited from the parent group.

Changing the value of a property of a command instance or command group instance affects the value in that instance as well as any derived instances that have not been overridden due to the inheritance. When a command is placed in a group, a new instance of that command is created as described above. When a property value is changed in a parent, each currently derived instance has its corresponding property value reset to that of the changed property value of the parent. This is done to propagate changes from the parent to derived instances. Subsequently, the property value of the derived instance may be further modified without causing a change to that of the parent.

When a first command group is included as a member of a second command group, a derived instance of the first command group is included in the second command group. The derived instance of the first command group may also include additional group members.

Through the use of command names, command qualifiers, and containment in different command groups, the command system allows multiple instances of the same command. Different instances of commands can contain different values in their command properties. For example, VIEW may be defined as a command group including three different ZOOM commands. Each of the three different ZOOM commands may provide a different level of magnification of displayed text. For example, the three ZOOM commands may have the associated display percentages used in rendering text: 50%, 100% and 200%. The command objects may be created for each of these ZOOM commands, each of the objects having a same command name with a different qualifier. The command subsystem provides a naming scheme that allows for reference to specific instance of commands:

"CommandName"—base or initial identifier of a command not contained in a group (e.g., field 252a contains a command name).

"CommandName?Qualifier"—a particular instance of a command

"GroupName.CommandName?Qualifier"—a particular instance of a command in a group with an optional qualifier.

The combination of command name and qualifier uniquely identifies a command within a command group. As described above, there may be multiple commands with the same command name in a group, e.g. various instances of the 'View.Zoom' command, but each command instance has a different qualifier. The qualifier itself is an opaque string that is not intended to have any function aside from naming. The naming strategy using qualifiers permits a command to have multiple instances in a single command group, and provides a way to distinguish them.

In connection with the use of groups, there may be more than a single level since command groups can contain other command groups. In such instances, a "GroupName" may refer to more than a single command group having a form of "GroupName1.GroupName2 . . . CommandName?Qualifier" where qualifier is optional.

As described above, the command registry performs merging based on the descriptions of commands and command groupings of each application component in a composite application. Merging is performed for commands and command groups having a same unique path name. The path name may be formed from a first portion describing any command group containment level of a command (e.g. GroupName1.GroupName2 . . . ) followed by a second portion consisting of either the command name (e.g., "CommandName") or the command name with optional qualifier (e.g., "CommandName?Qualifier"). As such, when command groups from multiple declarations of different application components such as 102 and 104 are merged together, the command instances with the same name and qualifier are merged with each other. Command instances within a same command group having the same name and qualifier are merged. For command instances not within a group, these command instances may also be referred to as base commands or prototype commands serving as a first or base generation upon which other command objects are based or derived from. Command instances having a same name which are not in a command group are merged. Command instances having a same name and qualifier which are not in a command group are merged. Merging results in creating a single command object for multiple non-unique descriptions of a command. Merging results in also creating a single command group object for multiple non-unique descriptions of a command group.

Command groupings are also merged based on the path name for the command group representing the command group's hierarchical location in the logical command groupings.

To illustrate merging, consider the following examples. If component 102 includes a base description of a command for "EDIT" and component 104 includes a base description of a command for "EDIT" (e.g., EDIT command definition not within a group), merging as performed during application startup by the command registry results in creating a single "EDIT" command object. As another example, both components 102 and 104 include an EDIT command group having as group members the commands CUT, PASTE and COPY. Both components may also include base descriptions for the commands CUT, PASTE and COPY. As a result of merging, three command objects are created for CUT, PASTE and COPY. A single command group object is created for the EDIT command group. A derived instance of each the CUT, PASTE and COPY objects are created and included in the EDIT command group.

Figure 5A:
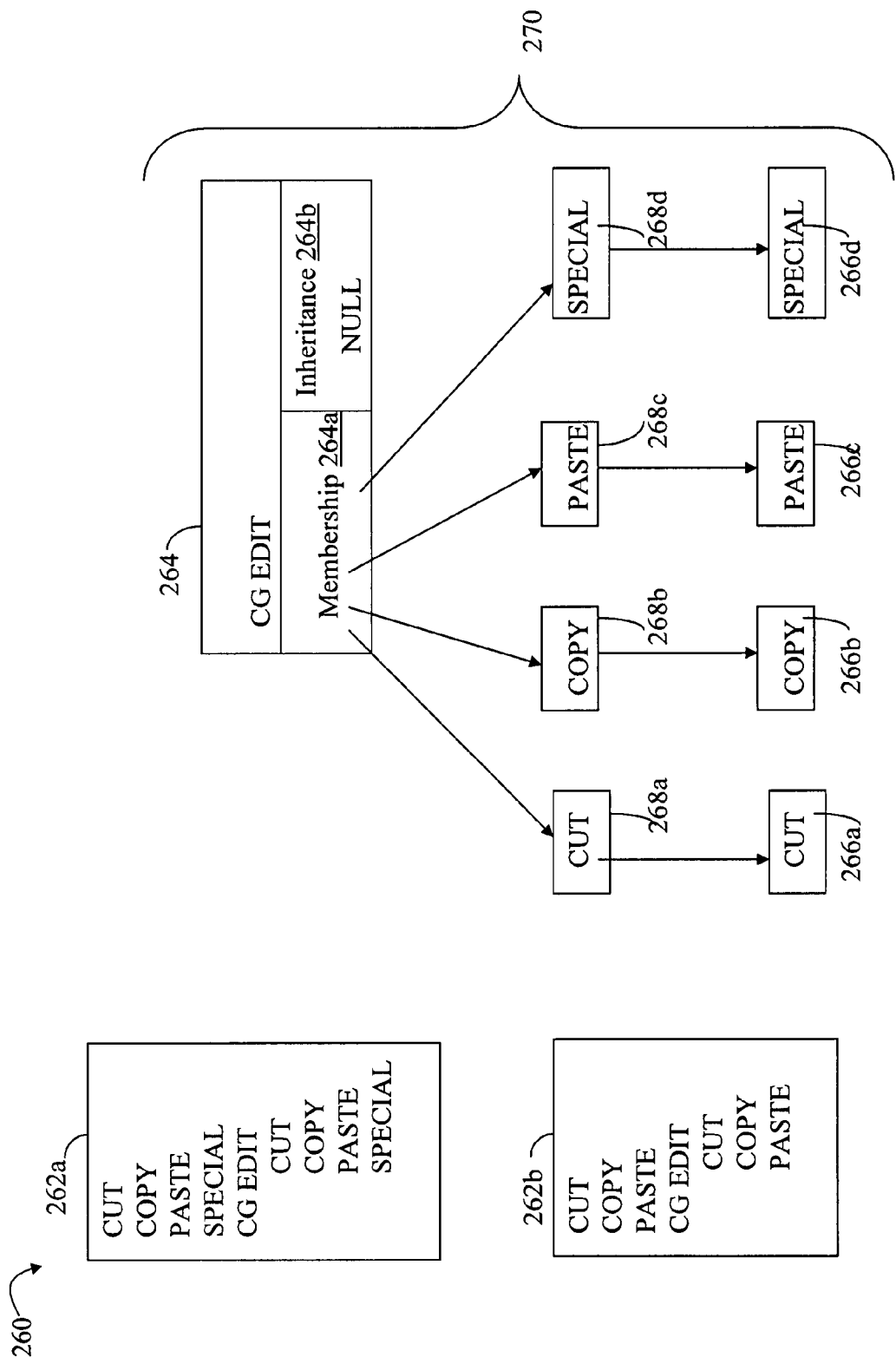
FIG. 5A is an example illustrating use of merging, inheritance and command grouping.

Referring to FIG. 5A, shown is an example illustrating objects created as a result of merging. The example 250 includes element 262a representing a first set of commands and associated organization of a first application component such as 102 of FIG. 3. Element 262b represents a second set of commands and associated organization of a second application component such as 104 of FIG. 3. The command registry may merge the foregoing of 262a and 262b upon startup of the composite application. Element 270 may represent the resulting objects created and included in the command registry. Element 262a includes base descriptions for the CUT, COPY, PASTE, and SPECIAL commands and defines an EDIT command group (denoted CG) including the foregoing commands. Element 262b includes base descriptions for CUT, COPY, and PASTE and defines an EDIT command group (denoted CG) including the foregoing commands. As a result of the merging, the base definitions for CUT, COPY, and PASTE are merged resulting in a separate command object for each of these commands as represented, respectively, by elements 266a-266c. The SPECIAL command only appears in 262a command object 266d is created without requiring merging with another description. The EDIT command group descriptions of 262a and 262b are merged resulting in a single command group object 264. The CUT, COPY and PASTE commands within the EDIT command group are merged resulting in creation of objects 268a-268c, respectively. Objects 268a-268c each have a pointer or reference back to their respective parent objects, 266a-266c. Since the SPECIAL command of the EDIT command group only appears in 262a, there is no merging with another description. The object 268d is created with a reference to its parent 266d. The EDIT command group object 264 includes membership references 264a to the objects corresponding to member instances of the command group 264.

During runtime of the composite application, component 102 may be in use at a first point in time. The objects 264 and 264a-d may be updated to reflect the state of the application at the first point in time. For example, if the user has text selected at the first point in time, the object 268a may have its enable/disable property updated to indicate that the CUT command is now enabled. The user interface may be updated to indicate the CUT command in the EDIT group enabled. If the user then deselects the text, the object 268a may have its enable/disable property updated to indicate that the CUT command is now disabled and the user interface may be updated to indicate the CUT command of the EDIT group as disabled. If the user then performs an action invoking component 104 at a second point in time, the objects 264 and 264a-d may be updated to reflect the state of the application at the second point in time in accordance with the component 104. In this example, the user interface may display the special command only when the component 102 having the commands of 262a is in use. When the state of the application changes to indicate that component 104 having the descriptions of 262b is in use, the objects may be updated to indicate that the SPECIAL command as represented by object 268d is not to be displayed by updating a property of the object 268d. With reference back to FIG. 3, the updated objects corresponding to the second point in time are sent to the component 118 for updating the user interface displayed. During runtime of the composite application, a new property may be added to one of the objects. For example, the user may perform an action which causes the CUT command to appear as bolded in the display. A new property may be added to the CUT command object representing this bolding and set with the appropriate value. A new command group may be created or a new command added to an existing command group during runtime of the application. In response, the appropriate objects are created in the command registry by the command processor and the data from the newly created objects is communicated to component 118 to update the user interface displayed. As an example of when a new command group is created during runtime of an application, a user may create a new toolbar. Using the techniques herein, a new command group representing that toolbar may be generated.

Examples further illustrating merging, inheritance and group membership are described elsewhere herein in following paragraphs.

Figure 6:
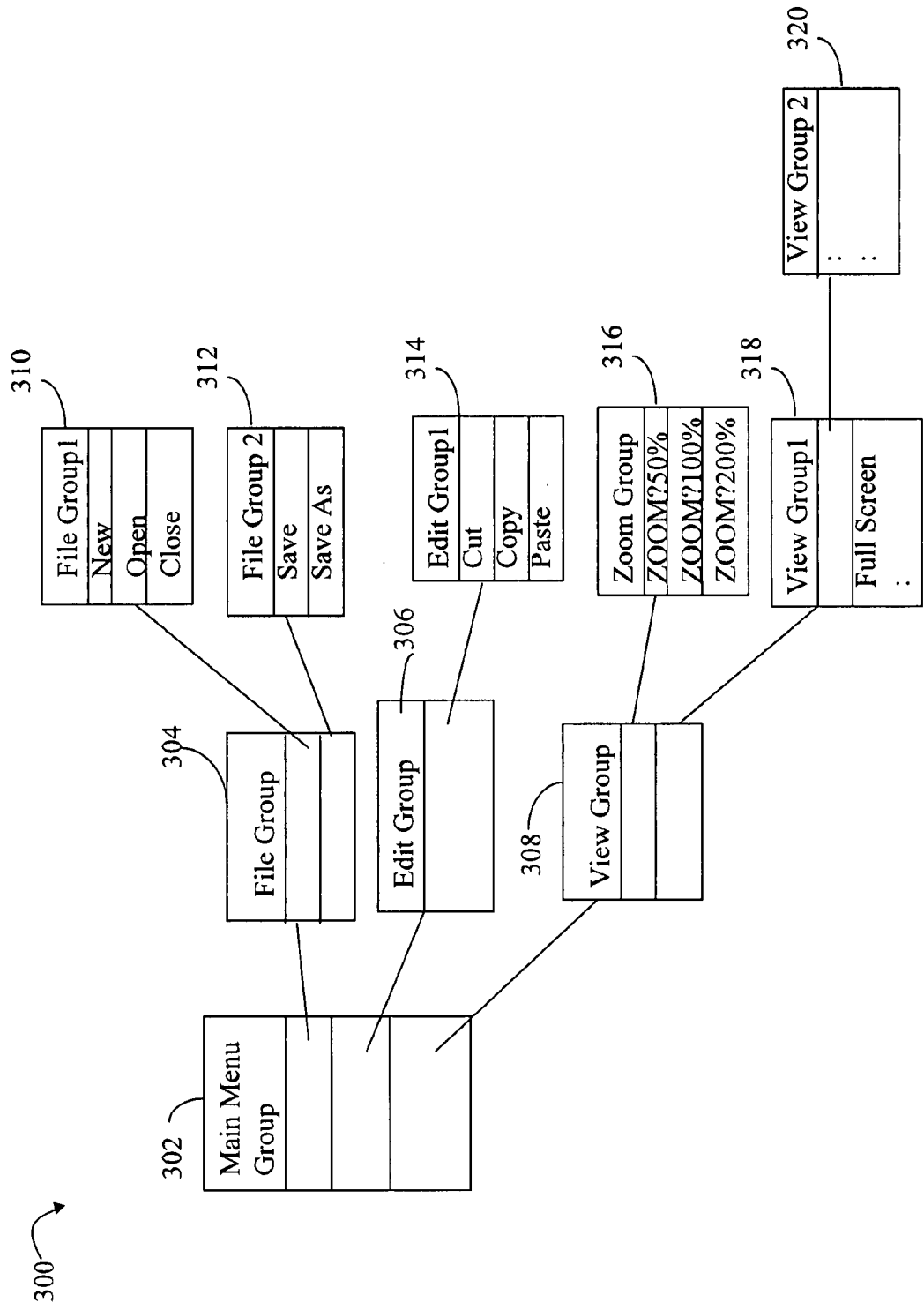
FIG. 6 is another example illustrating use of command grouping.

Referring to FIG. 6, shown is an example illustrating a logical grouping as may be defined using command groups. In the example 300, inheritance information is omitted for sake of simplicity in illustrating command groups having multiple levels of containment. In the example 300, elements 302, 304, 306, 308, 310, 312, 314, 316, 318 and 320 each represent a command group having its name indicated in the first field. Each other field represents a command group member which is either a command or a command group. The elements in 300 form a hierarchical or tree-like structure. The members of groups 310, 312, 314, and 316 are all commands. All the members of command groups 302, 304, 306, and 308 are command groups. Element 318 represents the VIEW-GROUP1 command group having a first member which is a command group as indicated by 320 with other members which are commands. If no member of a command group is another command group, there are no further containment levels in the structure defined. In this representation, references to group members which are commands are illustrated as having the command object instance included as a field of the containing command group. Group members which are command groups are represented by a connection to another command grouping element. For example, elements 304, 306, and 308 are members of the command group represented by element 302.

It should be noted that the illustration of FIG. 6 may depict a state after merging is completed. The merging process is described elsewhere herein.

Figure 7:
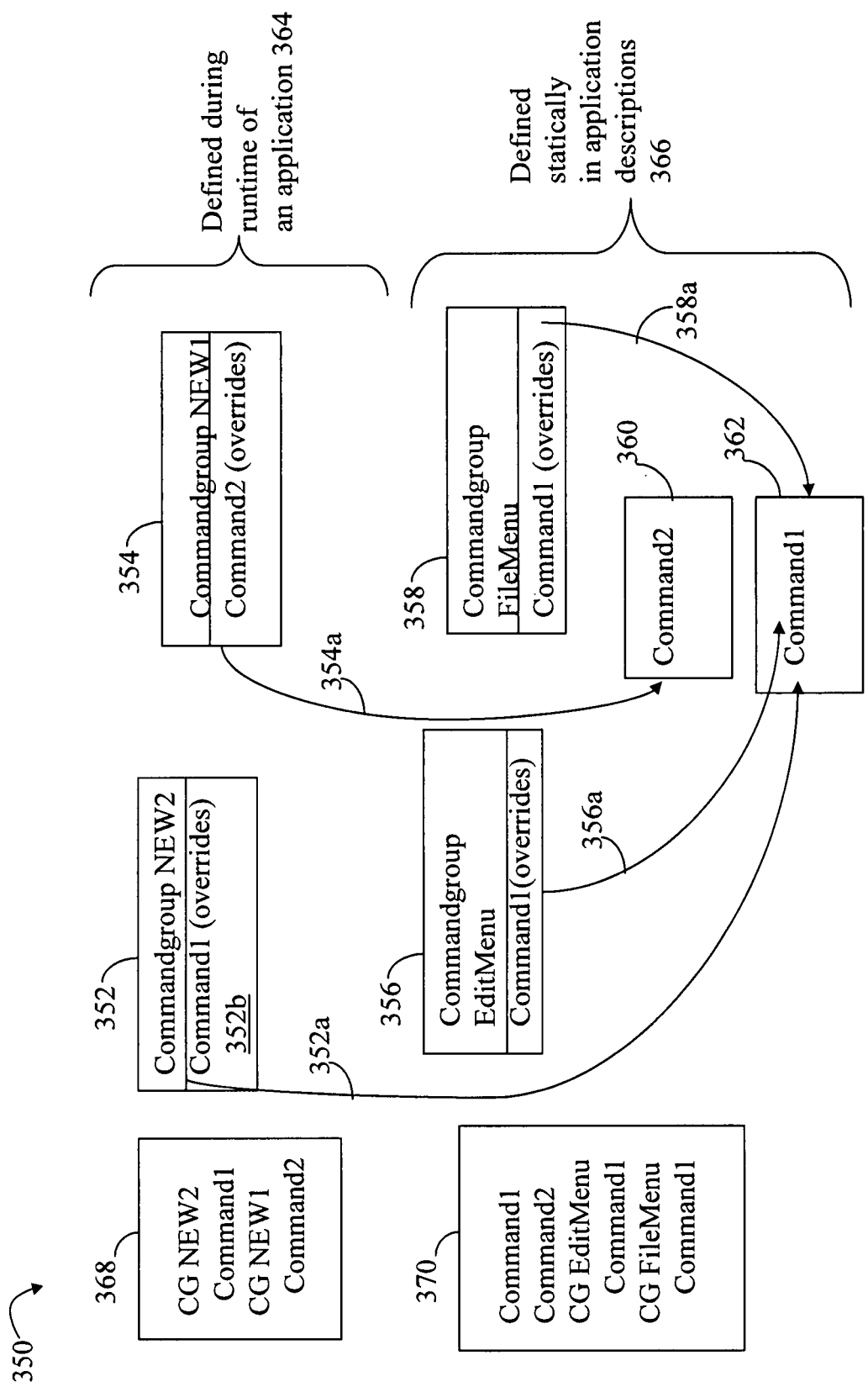
FIGS. 7 and 7A are examples illustrating use of inheritance and command grouping.

Referring to FIG. 7, shown is an example illustrating use of inheritance and overrides in connection with command properties. In the example 350, element 370 represents the commands and associated groupings for an application program as may be communicated to the command registry at application startup. For example with reference to FIG. 3, element 370 may represent the description of the commands and groupings as stored in an application component and communicated by the API 110 to the command registry 114. As a result, the command registry may create and initialized objects of 366. Element 370 includes base descriptions for command1 and command2 represented respectively by objects 362 and 360. Element 370 also defines command groups (CGs) EditMenu and FileMenu represented respectively by objects 356 and 358. The command objects contained within a command group are included in the command group objects 356 and 358 for simplicity in illustration. The EditMenu command group object 356 includes a derived instance of the command1 object with one or more properties defined having values which override those of the base object of command1 362. Command1 of the EditMenu command group 356 inherits the properties of the command1 object 362 as illustrated by 356a.

The FileMenu command group object 358 includes a derived instance of the Command1 object with one or more properties defined having values which override those of the base object of command1 362. Command1 of the FileMenu command group 356 inherits the properties of the command1 object 362 as illustrated by 358a. Changes to properties of the instance 362 are propagated to the derived command1 instances associated with command groups for 356 and 358 unless the derived command1 instances provide a property value which overrides those of 362. During runtime of the application, two new command groups NEW1 and NEW2 may be defined each including a previously defined command. Command group NEW2 results in creation of object 352 and command group NEW1 results in creation of object 354. Command group NEW2 352 includes a derived instance of command1 352b that inherits the properties of element 362 as indicated by arrow 352a. The derived instance 352b may also specify properties that override same named properties of command 1 object 362. Command group NEW1 354 includes a derived instance of command2 that inherits the properties of element 360 as indicated by arrow 354a.

The foregoing illustrates how an initial set of descriptions of commands and command groupings may include base commands and overrides for property values in 366 and how at runtime, additional command groupings and associated command overrides may be representing using previous descriptions (e.g., Command1 and Command2).

Figure 7A:
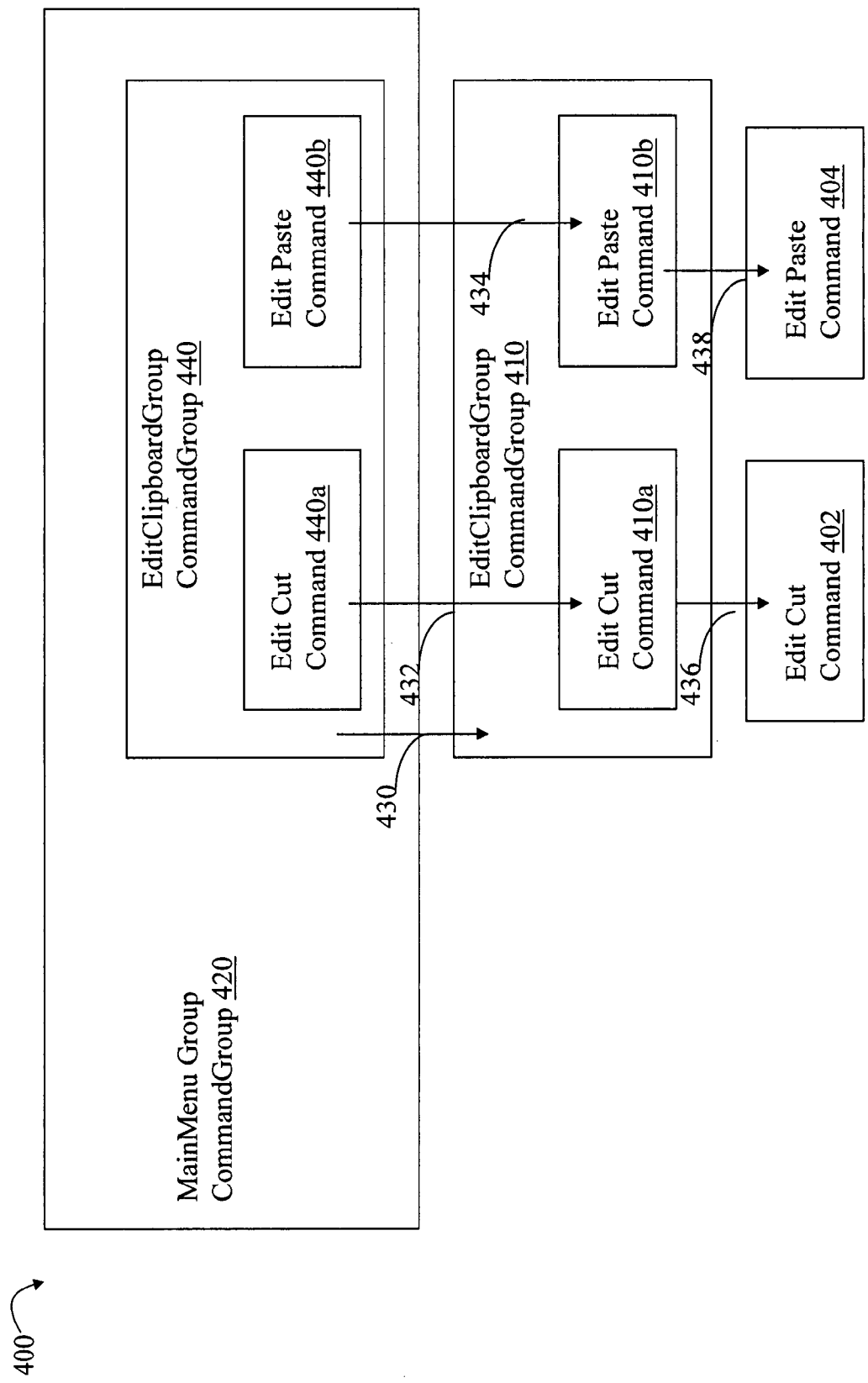

Referring to FIG. 7A, shown is an example illustrating derived instance of commands and command groups. In the example 400, the edit cut command 402 and edit paste command 404 may be created as parent objects. The editclipboardgroup command group 410 may also be created as a parent command group object. The command group object 410 includes two command object members 410a and 410b which are derived instances, respectively, of command objects 402 and 404. The arrows 436, 438, 430, 432 and 434 indicate the inheritance relationship between a derived object and its parent. Members of the command group are represented in FIG. 7A as included in the command group object. The mainmenugroup command group object 420 includes a single command group object represented by 440. The command group object 440 is a derived instance of command group object 410. Creation of object 440 results in creating derived objects 440a and 440b as group members of 440.

In the example 400, creating a derived instance of a command group results in creating a derived instance for each group member based on the parent command group object.

Another example illustrating group membership and inheritance will now be described with reference to FIGS. 8 and 9.

Figure 8:
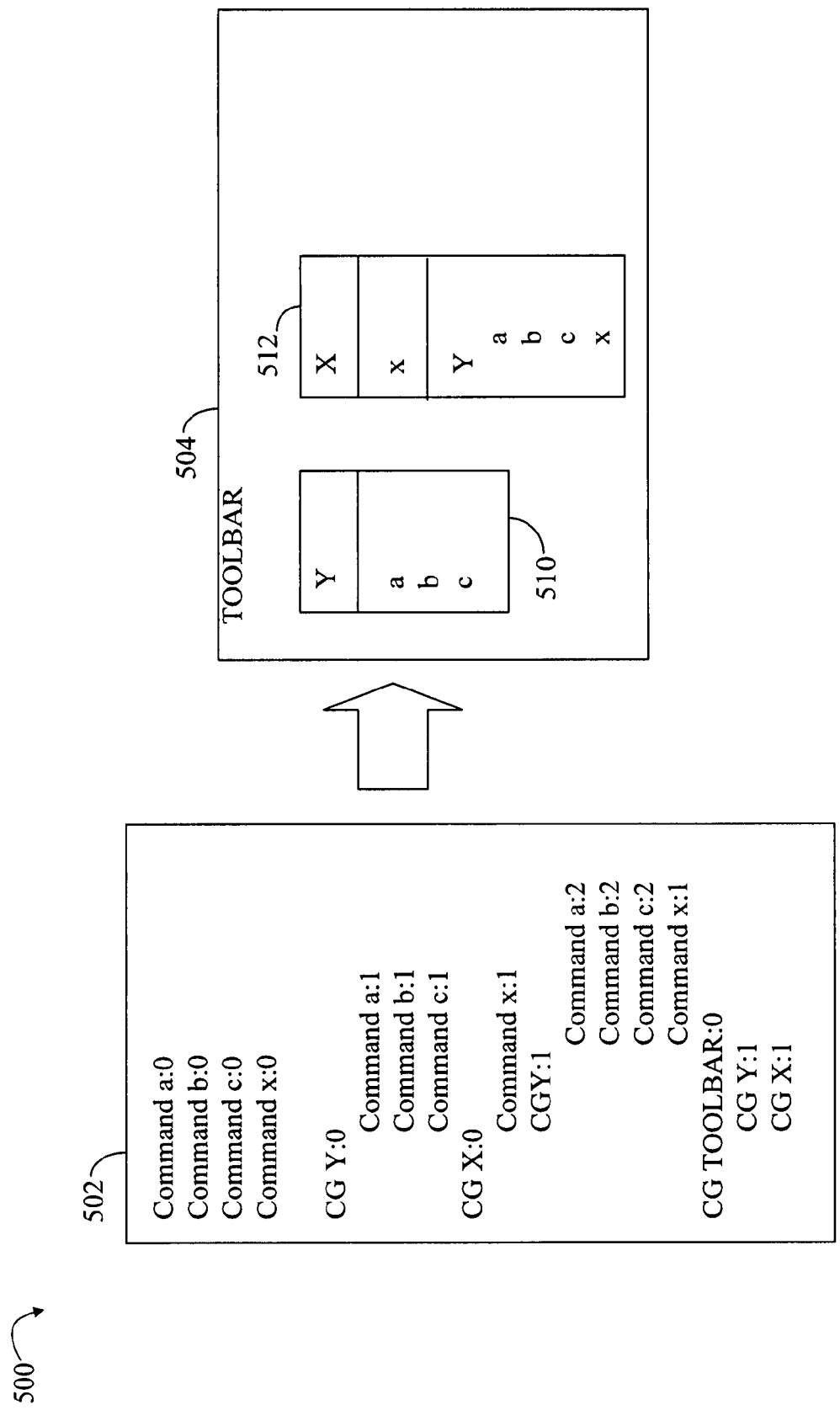
FIGS. 8 and 9 are examples illustrating the command grouping hierarchy and inheritance.

Referring to FIG. 8, included is a representation 502 of descriptions for commands and associated command groupings as may be initially provided to the command registry at program startup. In this example, element 502 has rows referring to commands of the following format:

Command <COMMANDNAME>:n where "n" represents the generation or level number of the object instance with respect to inheritance. Level 0 represents a base or root level definition. Subsequent children derived from level 0 instances are of level 1. Objects derived from level 1 instances are of level 2. Similar notation and format are used in connection with command groups (CGs). Element 504 represents how commands in the groupings of 502 may be included in a user interface displayed. Element 504 includes a toolbar TOOLBAR with pull-down menus 510 and 512 for each of CG Y and CG X, respectively.

With reference back to FIG. 3, the first (e.g., base or root) object instance of a command or command group may be stored in the command registry. This may be the case whether for base or root instances created during program start up by the command registry or later during program execution by another component such as the UI display component 118. Derived instances of commands and command groups created during program start up, such as included in the metadata attributes, may be stored in the command registry. Derived instances created after program start up, such as during program execution, may not be stored in the registry and are maintained by the component, such as component 118, which requested the instance creation.

Figure 9:
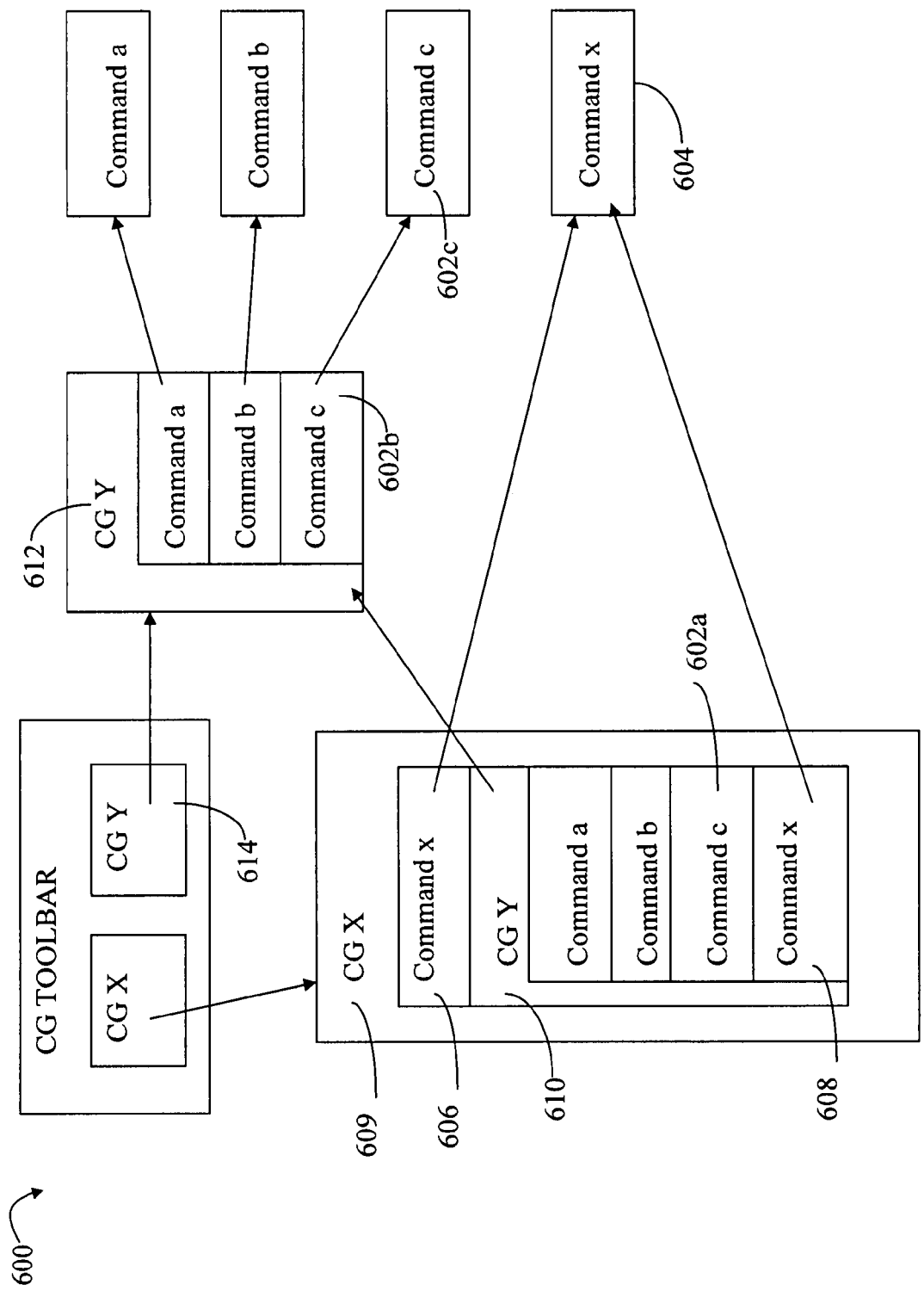

Referring to FIG. 9, shown is an example 600 illustrating the inheritance of the objects created for the descriptions of commands and command groupings of 502 from FIG. 8. For sake of simplicity, objects contained within a group are included in the command group object as similarly represented in connection with other figures above. The arrows illustrate the inheritance of the different property values from parents and other ancestors.

The example 600 includes three instances of command objects for command c. A base instance is 602c. Element 602b represents a first level command object instance derived from 602c. Element 602a represents a second level command object instance derived from 602b. In this example, 602a inherits properties from both 602b and 602c instances. Any property values of 602b override those of 602c. Any property values of 602a override those of 602b and 602c. The foregoing with command c illustrates multiple levels of ancestors for inheritance.

The example 600 also includes three instances of command objects for command x. A base instance is 604. Elements 606 and 608 each represent a second level command object instance derived from 604. Any property values of 606 override those inherited from 604. Any property values of 608 override those inherited from 604. In this example, the instances 606 and 608 are both derived from a same base level object 604 even though instance 606 and 608 are at different containment nesting depths.

In connection with command groups, a base level command object instance for CG Y is represented by element 612. The object 609 for CG X contains as a member an instance of CG Y 610 derived from object 612. In this example, the object 609 includes an additional command x (as represented by element 608) in the CG Y 610. The instance 610 inherits properties from the instance of 612 with any overrides for property values provided in 610 such as, for example, in connection with the instance 602a for command c 602 as described above.

In connection with merging commands, members of a command group may be organized into one or more buckets. A property may be specified with commands and command groups to indicate into which bucket each commands and command group is placed when specified as a member of a command group. In one embodiment, five order buckets may be defined and specified with a list of property values of: "First", "Early", "Default", "Late", "Last", with "First" being the first bucket and "Last" being the last bucket. The ordering of the members within an order bucket may be performed in accordance with any ordering. An embodiment may include a larger or smaller number of buckets than as defined herein and use different property values to denote the bucket ordering. Fine grained ordering can be achieved by introducing additional command groups.

Figure 10:
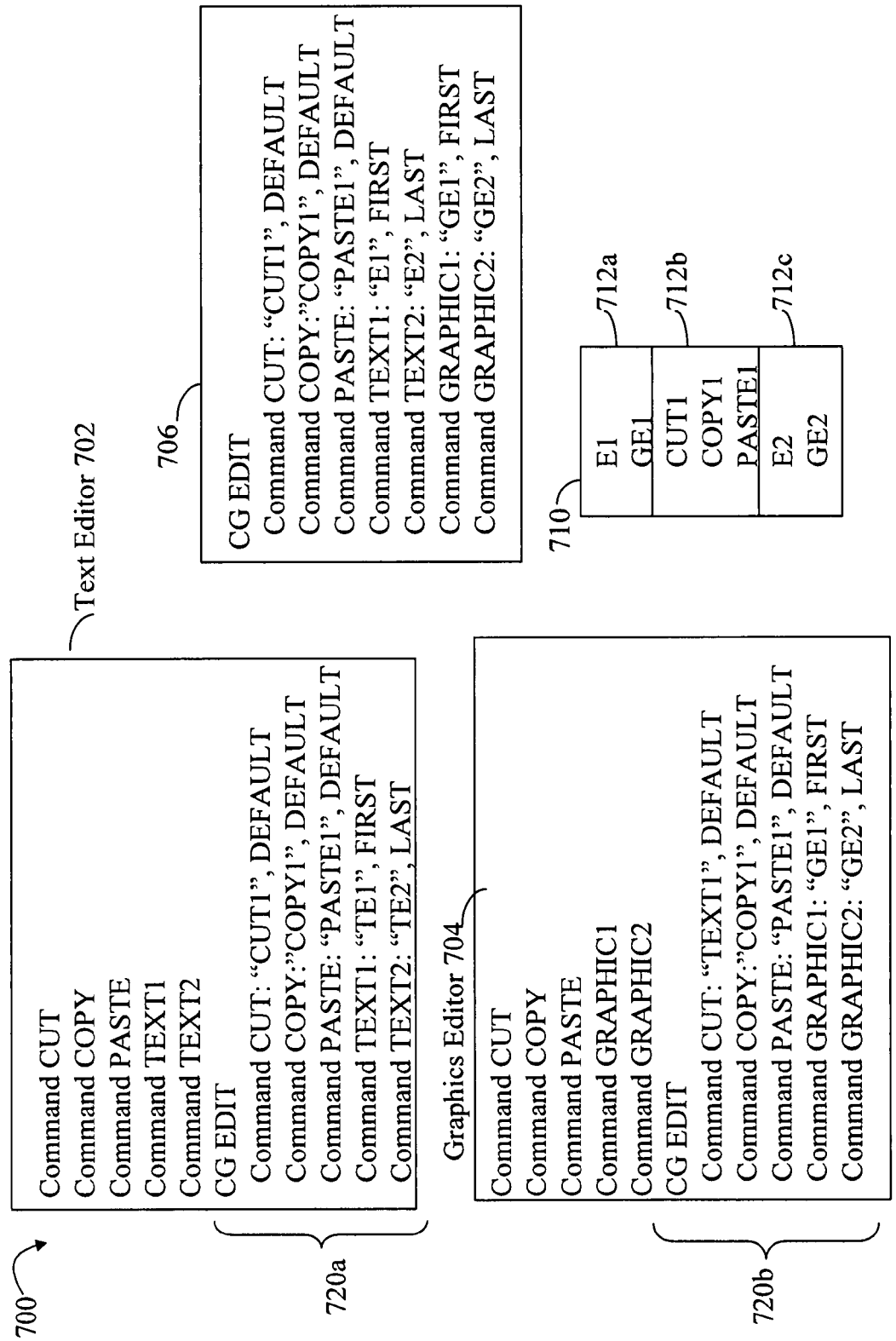
FIG. 10 is an example illustrating use of buckets in connection with merging descriptions of commands and command groupings.

FIG. 10 illustrates how the ordering property may be used in connection with merging. The example 700 includes a first set of descriptions for commands and command groupings used by a text editor 702 and a second set of descriptions for commands and command groupings used by a graphics editor 704. The contents of 702 and 704 may be provided to the command registry at application startup for merging. Element 706 may represent the merged results of the EDIT command group (CG) portions 720a and 720b. In this example, the CUT, COPY and PASTE commands of the EDIT CG are merged. Portion 720a includes commands TEXT1 and TEXT2 and Portion 720b includes commands GRAPHIC1 and GRAPHIC 2 which are included in the EDIT CG represented by 706. The CUT, COPY, and PASTE commands have an indicated bucket ordering of DEFAULT placing them in the third bucket of the displayed commands. The commands TEXT1 and GRAPHICS1 have an indicated bucket ordering of FIRST placing them in the first bucket. The commands TEXT2 and GRAPHICS2 have an indicated bucket ordering of LAST placing them in the fifth and last bucket. In this example, there are no commands in buckets 2 and 4. Element 710 represents an ordering of the commands within the EDIT CG in accordance with the foregoing buckets. The FIRST bucket is 712a, the DEFAULT bucket is 712b and the LAST bucket is 712c. The element 710 may represent the ordering of commands as rendered on a user interface element such as a menu.

It should be noted that an embodiment may determine and perform processing to handle property value conflicts in connection with bucket ordering. For example, the TEXT1 command of the text editor 702 may have a different property value than the TEXT1 command of the graphics editor 704. In such cases, an embodiment may determine the different orderings specified as property values in connection with merging during loading of the application components. An embodiment may perform any one of a variety of different resolutions such as, for example, using the value of the bucket ordering included in the component which is loaded last.

In the foregoing, the bucket describes the relative placement of commands in a same command group when merged.

Any one of a variety of different formats may be used to represent the descriptions of commands and command groupings as described herein. In one embodiment, the foregoing may be expressed in an XML representation with a root node named "CommandDescriptions". This root node contains a list of children, which are all either named "Command" or "CommandGroup". The "Command" elements define commands at this first outermost or base XML level which are independent of their placement in groups. At this base level, a description for a command or a command group may be specified with basic properties that can be overridden whenever that command or command group appears in a group. For each command and command group, Name and the Properties may be specified.

In one embodiment, the Name of a command is a string which ultimately binds the command to a particular set of handlers. The Properties are used to specify the default values for named properties. A command Name may contain a question mark character '?' for the optional command qualifier as described above. In connection with forming the name binding for handlers in one embodiment, the question mark and everything following is ignored when the system binds the command to a handler. In other words, characters before a '?' specify which handler to use, and characters after a '?' are meaningless with respect to forming the handler binding except to differentiate different commands with unique names. The command qualifier specified for a command object instance may be passed to the method of a particular command Name for processing.

The "CommandGroup" elements define command groups, which are containers for command groups and commands as described herein. Like the command elements, the groups have names which may be bound to handlers in a similar fashion. The inner "Command" and "CommandGroup" elements (e.g., other than those at the base level) can specify Properties overrides. This allows a command to appear differently in different groups. For the purposes of readability and for ease of processing in an embodiment, inner nested "CommandGroup"s do not further specify their contained elements, but leave this to the base level command groups, as in the case of the command group "FileMenu" in the example below. The over all structure of a description for the commands and command groupings may be an XML blob having the following structure:

```
Command 1
    Properties
Command2
    Properties
:
Command n
    Properties
CommandGroup Menus
    CommandGroup FileMenu
    CommandGroup EditMenu
    CommandGroup HelpMenu
:
```

-continued

```
CommandGroup FileMenu
    Properties
    Command 1
        Properties (for override of Command 1)
    Command 2
    Command 3
        Properties (for override of Command 3)
    :
```

The foregoing provides for defining a command and then including the command into command groups where appropriate with any needed overrides for command properties specified.

In connection with different techniques described herein, in one embodiment, the XML description may be the format and content of the file which is read by the API or command registry. In another embodiment, the XML description may be provided to the compiler along with other code for an application component and used in producing corresponding metadata included in a generated code module.

With the use of different levels in conjunction with a base level description of a command, the same command may appear differently in different command groups. A command or command group instance may be dynamically modified during runtime to have a property updated in accordance with a user action or other state change. A command or command group may be modified by modifying an existing property value, defining a new property value, or in connection with a command group, adding/removing group members.

The foregoing provides for representing commands and command groups with associated properties using an extensible object representation. A set of base commands and command groupings may be specified and associated property values may be propagated using inheritance as described herein when creating derived instances. The derived instances may also be customized by providing property values in the derived instances which override and inherited property values. The properties of command group objects and command objects may correspond to visual aspects of how the associated object is visually represented in the user interface. The properties may represent the state of the object using binary state values as well as execution parameters having different values, such as a numeric value for a menu selection or setting.

It should be noted that although the techniques herein are described with reference to commands included in a user interface, it will be appreciated by those skilled in the art that the techniques herein may be used in connection with other types of user interface data elements. For example, the techniques herein may be used to represent different options and associated settings that may vary with each application component. The options for each application component may be presented to the user with a single user interface and may be described as set forth herein. For example, a composite application program may include a graphics editor and a text editor. The graphics editor may have a set of options related to graphics settings such as brush characteristics, fill options for various objects, and the like. The options may be used to specify default settings or selections for use in connection with the graphics editor. The text editor may have a different set of options than the graphics editor. The techniques herein may be used to present the possible options and current settings for both the graphics editor and the text editor in a single user interface presentation. As the user selections and settings of the current options change, the menus or other user interface element used in rendering the options data may be accordingly updated.

The techniques herein provide a variety of advantages that will be appreciated by those skilled in the art. For example, the techniques herein may be used in connection with the composite application program described above. The techniques herein may be used in a development environment which allows each of the different application programs of the composite application contributing to a single user interface to be independently developed while also having a single user interface. Although the techniques herein have been illustrated using a composite application, the techniques herein may also be used in connection with application programs which are not characterized as composite applications. In other words, the techniques herein may be used with an application program consisting of only a single component.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of representing commands of a user interface of an application comprising:
    receiving one or more command descriptions for one or more commands, each of said one or more command descriptions having one or more properties and representing an instance of one of the commands;
    receiving one or more command group descriptions for one or more command groups, each of said one or more command group descriptions having one or more properties, representing an instance of one of said command groups at a level in a group hierarchy, and specifying one or more group members, each of said one or more group members representing a derived instance of one of said commands or a derived instance of one of said command groups, properties of each derived instance of a command and each derived instance of a command group inheriting properties from one or more ancestor instances;
    storing a first derived instance of a first command of the one or more commands or of a first command group of the one or more command groups in metadata attributes in a command registry;
    deriving a second derived instance of a second command of the one or more commands or of a second command group of the one or more command groups using one or more processing units;
    not storing the second derived instance in the metadata attributes in the command registry; and
    maintaining the second derived instance in a component that requests creation of the second derived instance.

2. The method of claim 1, wherein a command group instance includes a third derived instance of a command having a first property with a first value, and an ancestor of said third instance is a fourth instance of said command having said first property with a second value, said first value overriding said second value for said third instance.

3. The method of claim 1, wherein a command group instance includes a third derived instance of a command having a first property with a first value and an ancestor of said third instance is a fourth instance of said command having a second property with a second value, said third instance inheriting said second property with said second value from said fourth instance.

4. The method of claim 1, further comprising:
populating one or more user interface elements for display having a logical structure in accordance with said group hierarchy.

5. The method of claim 4, wherein said user interface elements include at least one of a menu, a toolbar, and a ribbon, said ribbon being a strip across a displayed window indicating all functions that can be performed by the application.

6. The method of claim 1, wherein said one or more properties include one or more of: menu text, an image, a parameter having a modifiable value.

7. The method of claim 6, wherein said parameter is a binary valued parameter.

8. The method of claim 6, wherein the parameter represents a numeric value determined in accordance with a user-specified setting.

9. The method of claim 1, further comprising:
modifying a property value of an instance of one of a command or a command group during runtime of the application in response to a user action.

10. The method of claim 1, further comprising:
creating a derived instance during runtime of the application, said derived instance being derived from one of a command instance or a command group instance.

11. The method of claim 10, wherein the derived instance of said creating step is included as a member of a command group.

12. The method of claim 1, further comprising:
adding a property value of an instance of one of a command or a command group during runtime of the application.

13. A method of representing data elements in a user interface of a composite application comprising:
receiving, for each application component of said composite application, one or more data element descriptions for one or more data elements, each of said one or more data element descriptions having one or more properties;
receiving, for each application component of said composite application, one or more group descriptions for one or more data element groups, each of said one or more group descriptions having one or more properties and specifying one or more group members, each of said one or more group members being one of said data element groups or one of said data elements; and
merging, using one or more processing units, said one or more data element descriptions and said one or more group descriptions for each application component of said composite application producing a merged set of data element descriptions and group descriptions.

14. The method of claim 13, further comprising:
creating an instance of a data element for each data element description in said merged set.

15. The method of claim 14, further comprising:
creating an instance of a data element group for each group description in said merged set.

16. The method of claim 15, wherein, for each group description in said merged set, the method further comprising:
creating a derived instance for each group member included in said each group description, said derived instance being a derived data element instance if said each group member is a data element, said derived instance being a derived data element group instance if said group member is a data element group.

17. The method of claim 16, wherein a property specified for each group member indicates placement of said group member in a one of a predetermined number of buckets, said predetermined number of buckets determining a relative ordering of said each group member with respect to other group members.

18. A method of representing commands in a user interface of a composite application comprising:
receiving, for each application component of said composite application, one or more command descriptions for one or more commands, each of said one or more command descriptions having one or more properties;
receiving, for each application component of said composite application, one or more group descriptions for one or more command groups, each of said one or more group descriptions having one or more properties and specifying one or more group members, each of said one or more group members being one of said command groups or one of said commands;
merging, using one or more processing units, said one or more command descriptions and said one or more group descriptions for each application component of said composite application producing a merged set of command descriptions and group descriptions;
creating an instance of a command for each command description and an instance of a command group for each group description included in said merged set; and
for each member of each command group included in said merged set which is a command, creating a derived command instance inheriting property values from another command instance, and for each member of each command group included in said merged set which is a command group, creating a derived command group instance inheriting property values from another command group instance.

19. The method of claim 18, wherein, for each command group, members of said each command group are placed in buckets in accordance with a property value specified for each of said members, said buckets indicating relative ordering of members in said each command group.

20. The method of claim 18, further comprising:
modifying, during runtime of said composite application, at least one property associated with an instance or a derived instance in accordance with a state change of said composite application.

* * * * *